J. L. LE CONTE.
Electric Induction Coil.

No. 217,466. Patented July 15, 1879.

Attests

Inventor
John L. Le Conte
By his Attorneys
W. C. Strawbridge,
J. Bonsall Taylor

J. L. LE CONTE.
Electric Induction Coil.
No. 217,466. Patented July 15, 1879.
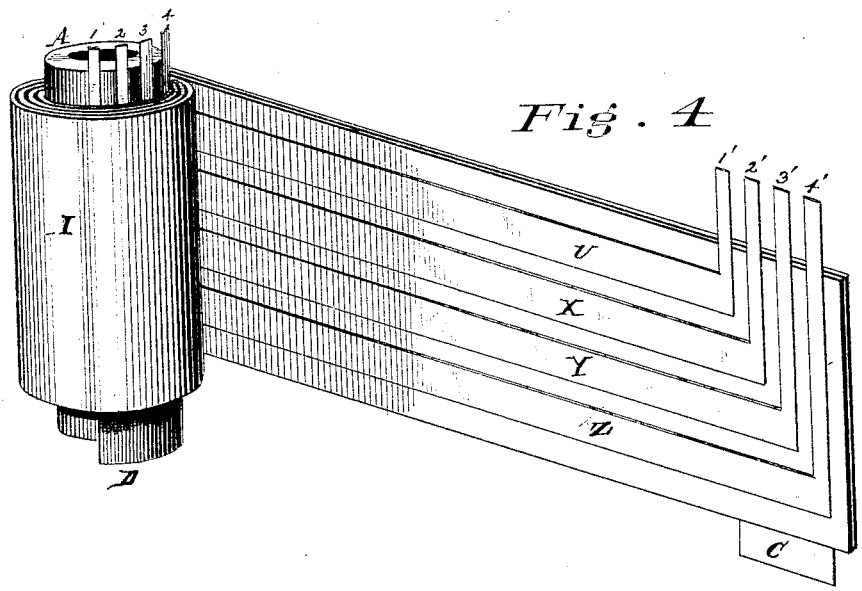
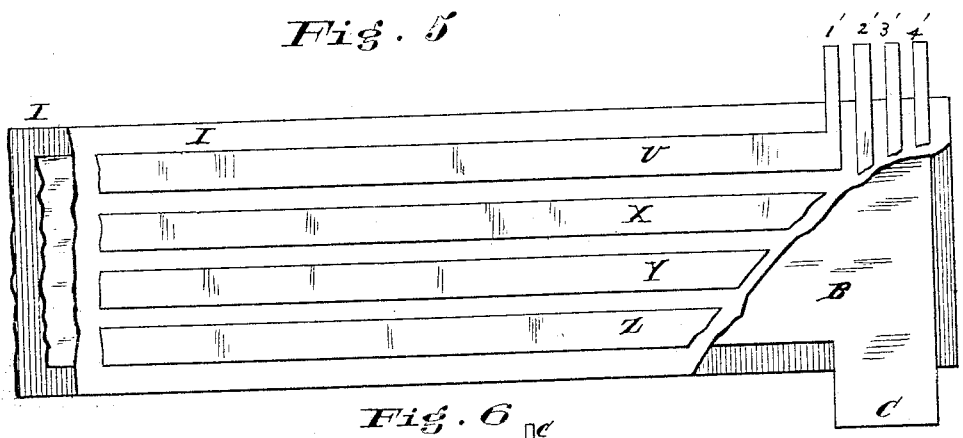
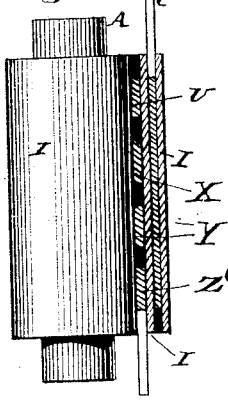
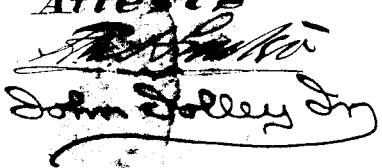

UNITED STATES PATENT OFFICE.

JOHN L. LE CONTE, OF PHILADELPHIA, PENNSYLVANIA.

IMPROVEMENT IN ELECTRIC INDUCTION-COILS.

Specification forming part of Letters Patent No. 217,466, dated July 15, 1879; application filed November 6, 1878.

*To all whom it may concern:*

Be it known that I, JOHN L. LE CONTE, of Philadelphia, in the State of Pennsylvania, have invented a new and useful apparatus for producing induced currents of electricity at different points along an electric circuit, of which the following is a full, clear, and exact description.

My invention relates to apparatus for the utilization of the property of induction for the subdivision of a current of electricity passed through a main circuit from a dynamo-electric or other electric machine, the induced currents being taken off at places where it is requisite to have subdivision for the purpose of lighting dwellings or for other purposes, and my apparatus effectuating the taking off of induced currents without impairment by waste to the direct current of the generating-machine.

Heretofore, in the subdivision of the currents of electric circuits, the production of smaller currents, when attempted by means of induction, has been a failure, by reason of the costly and cumbersome apparatus employed.

My invention aims at the production of a compact induction apparatus adapted for the subdivision of the main current into one or into many currents.

Figure 1:
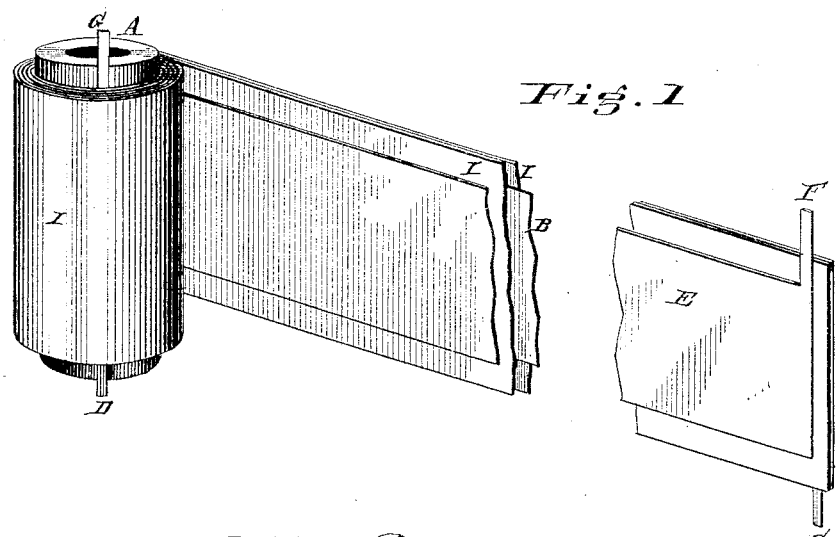
Figure 2:
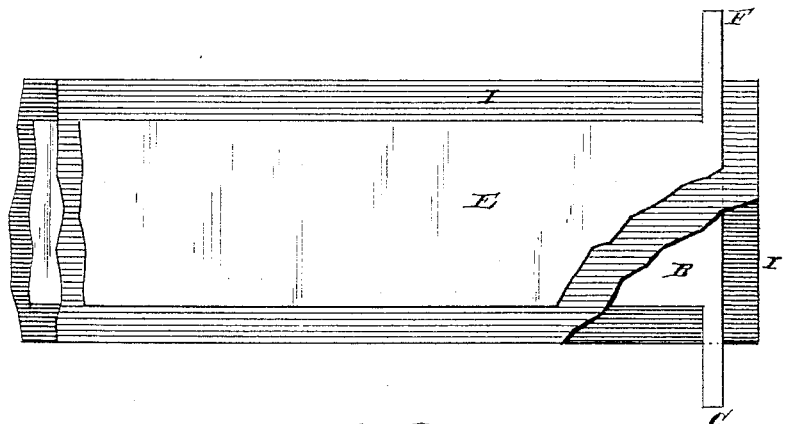
Figure 3:
Figure 3:
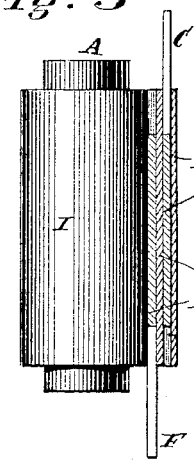

In the accompanying drawings I have represented my apparatus. Figure 1 shows, in perspective, my induction device, the sheets being partially unwrapped for the sake of clearer illustration. When rolled up any suitable insulating-wrapper retains the bands and layers. Fig. 2 shows, in plan, the band of metal and the wires for connection and the insulating layer. Fig. 3 shows the same in sectional elevation. In all of the above figures is represented an apparatus calculated for a single-induced current. Figs. 4, 5, and 6 are similar views of the same, arranged for the production of four subdivided induced currents.

The same parts are indicated by the same letters in each of the sheets.

The apparatus represented in Figs. 1, 2, and 3 consists of two long bands of thin metal—iron, tin, copper, or any other that is sufficiently malleable and cheap—wrapped with interposed layers of insulated material, such as oil-skin, varnished muslin, or other thin fabric, rendered a non-conductor by the application of shellac-varnish, india-rubber, gutta-percha, or other insulating material of organic origin.

The bands of metal are of less width than the sheets of insulating material, so that no passage of electricity over the edge of the sheets can occur.

The bands and layers, thus arranged each with a conducting wire or ribbon at each end, are rolled into cylindrical form upon and around a small hollow cylinder of suitable material and convenient dimensions, made hollow in order to leave place for the introduction of a soft-iron bar when the electric current requires modification by such influence.

For the better insulation of the apparatus, such portions of the sheets of insulating material as are not covered by the metal bands may be smeared with shellac or other varnish.

In the apparatus represented in Figs. 4, 5, and 6, which is adapted for the production of more than one induced current, there are substituted for one of the sheets of metal of the first-described form two or any number (in the drawings four are shown) of narrower strips of metal laid between the layers of insulating material longitudinally and parallel with each other, the said strips being separated from each other a sufficient distance to insure perfect insulation.

Conducting wires or ribbons are attached to each end of each of the strips, a convenient arrangement for so doing being represented in Figs. 4, 5, and 6, and for the better insulation a small piece of non-conducting material should be laid between the conducting-wires and the metal sheet, which they may cross if they are brought out to the ends of the cylinder. When, however, the wires are carried to the core of the central cylinder, such arrangement is unnecessary.

In Figs. 1, 2, and 3 of the drawings, A represents the hollow central cylinder; B, the conducting-band through which the main current passes; C and D, the connections of the conducting-wires of the main circuit; E, the band in which the induced current is generated; F and G, the connections for the wires of the induced currents, and I I the insulators.

In Figs. 4, 5, and 6 the lettering is the same, with the exception that the strips in which the induced currents in such form are generated are marked V, X, Y, and Z, their wire-connections 1, 2, 3, and 4, and 1', 2', 3', and 4'.

Such being the construction of my apparatus, when used in a system of illumination of dwelling-houses, for instance, my device takes the place of a meter in the old system of gas-illumination, is conveniently placed in the cellar, and connected with the wires of the main circuit and with the required number of wires forming circuits for the illuminating devices.

I do not claim the application of the well-known principle of induction to the subdivision of an electric current; but I claim the apparatus which I herein describe as adapted for the utilization of such principle, as said apparatus has the advantage of compactness due to the cylindrical contour, while the helical form insures greater strength in the induced current by reason of the extended surfaces acted on.

The arrangement of the cored central cylinder permits the modifying influences which the introduction of the iron core effects.

The use of the several strips, arranged as hereinbefore described, gives as many separate induced currents as there are strips with the employment of a single exciting-surface.

Having thus described my invention, I claim and desire to secure by Letters Patent of the United States—

1. An apparatus for producing induced currents of electricity at different points along the circuit of the current of dynamo-electric or other electric machine, which consists of two long bands of metal wrapped with two interposed layers of insulating material, each of said strips of metal being provided at both ends with a conducting-wire, said bands of metal and layers of insulating material being spirally rolled into cylindrical form around a small hollow cylinder, substantially as described.

2. An apparatus for producing induced currents at different points along the circuit of a dynamo-electric or other electric machine, consisting of a broad band of metal and of a series of narrower strips of metal, together with interposed layers of insulating material, the whole wrapped in helical form, and the band and strips respectively provided near their several extremities with conduction-wires, those of the band being for the main current and those of the strips for the several induced currents, substantially as described.

3. An apparatus for producing induced currents at different points along the circuit of a dynamo-electric or other electric machine, consisting of a broad band of metal and of a series of narrower strips of metals, together with interposed layers of insulating material, the whole wrapped in helical form upon a central hollow cylinder adapted to receive a soft-metal core, and the band and strips respectively provided near their several extremities with conducting-wires, those of the band being for the main current and those of the strips for the several induced currents, substantially as described.

In testimony whereof I have hereunto signed my name this 4th day of November, A.D. 1878.

JOHN L. LE CONTE.

In presence of—
J. BONSALL TAYLOR,
WM. C. STRAWBRIDGE.